Oct. 28, 1924.  1,513,176
C. H. LYDE
CASE FOR CONTAINING CAMERAS
Filed April 18, 1922   2 Sheets-Sheet 2
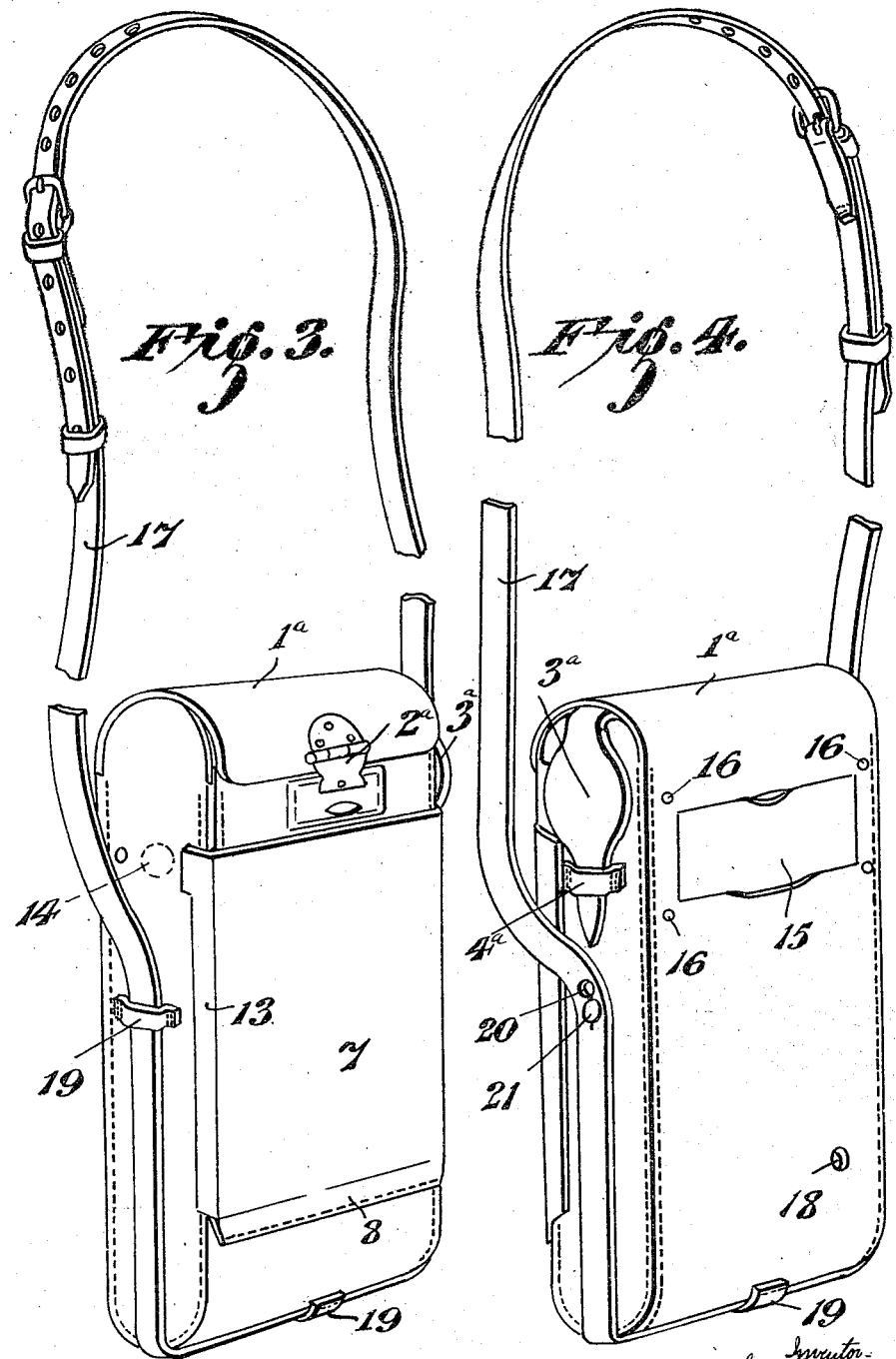

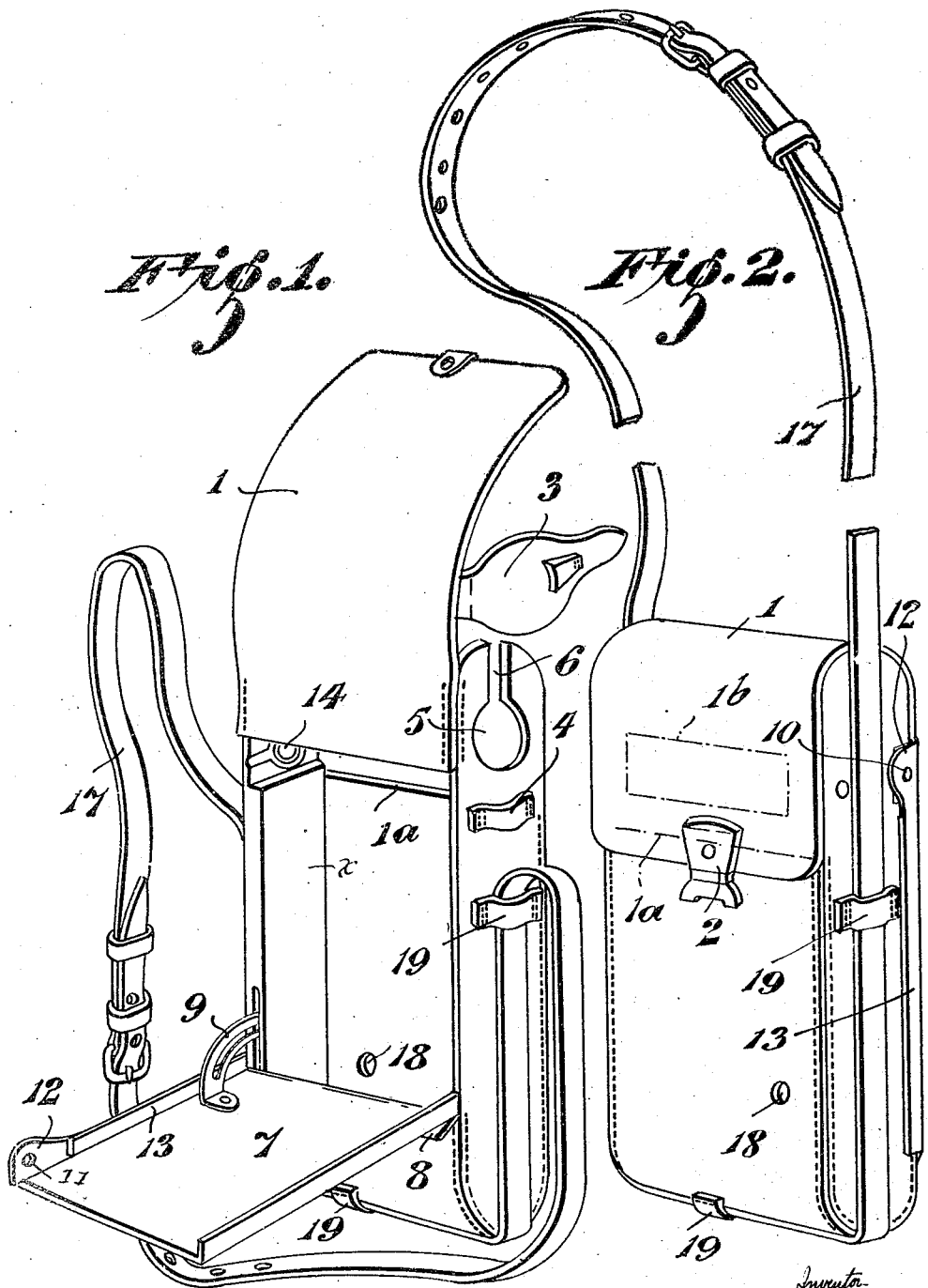

Patented Oct. 28, 1924.

1,513,176

UNITED STATES PATENT OFFICE.

CHARLES HENRY LYDE, OF DORRIDGE, ENGLAND.

CASE FOR CONTAINING CAMERAS.

Application filed April 18, 1922. Serial No. 554,984.

*To all whom it may concern:*

Be it known that I, CHARLES HENRY LYDE, a subject of the Kingdom of Great Britain, residing at Dorridge Croft, Dorridge, in the county of Warwick, England, have invented a new or Improved Case for Containing Cameras, of which the following is a specification.

This invention comprises a new or improved case for containing a camera, and it particularly comprises a case adapted to contain a folding camera, the characteristic feature of the present invention residing in the fact that the camera can be used without removing it from the case.

With this object in view, the case involves a closure portion which may be opened to permit of the unfolding of the camera into its in-use position.

The means for releasing this closure portion are of a character such that they are adapted also to release the camera so that it can be unfolded.

The invention advantageously comprehends a second closure portion permitting of the entire removal of the camera when in its folded condition.

The invention advantageously comprehends also a third closure member permitting of access to the writing slot of an autographic camera.

The camera is adapted to be actuated for the purpose of advancing the film while it is in the case. With this object in view, an opening is provided in the case offering access to the film operating device. This opening may be closed by a suitable closure portion.

In a convenient embodiment of the present invention, as designed to enclose a folding camera such as is at present sold under the registered trade mark "Kodak", the case is composed of leather and is of shape substantially corresponding with the shape of the camera in its folded condition.

In order that this invention may be clearly understood and readily carried into practice, reference may be had to the appended explanatory two sheets of drawings, upon which:—

Figure 1 illustrates an embodiment of the present invention, showing the case in the open condition.

Figure 2 illustrates the embodiment of the present invention shown in Figure 1, with the case in the closed condition.

Figure 3 illustrates a modified embodiment of the present invention from the front of the case, with the latter in the closed position.

Figure 4 illustrates the embodiment shown in Figure 3 from the rear of the case.

Referring to Figures 1 and 2, at the top the case comprises a closure portion 1 which is flexible and adapted to be wrapped over the top of the camera from the front where it is permanently attached as at 100 and detachably secured at the back by a catch 2 so that the camera can be extracted upwardly when the top closure is open. The lower portion $x$ of the fixed front end of the closure portion 1 forms a bar or strip to bear against the top of the camera at the front, and thereby prevents the camera from falling forwardly when the closure and the fall front of the camera are open.

The front of the case is formed with a closure member 7 hinged at its lower extremity 8, and which is adapted to be opened downwardly. This front closure member 7 may be furnished with strut-like portions 9 which limit the extent of its downward opening. This member 7 is adapted to be secured in its closed position by a snap-action securing device consisting, for instance, of a projection 10 upon the side element of the case adapted to engage within a perforation 11 in a flange 12 formed on one side 13 of the closure member 7. This projection 10 is adapted to be forced inwardly by pressing a button or equivalent device 14 provided under the surface of the leather comprising a side wall of the case, and this button 14 is also adapted to press upon the button or like device which releases the front closure portion of the camera itself, so that upon pressing this button 14 the front of the case is opened and the front of the camera released so that it is only necessary to allow these two elements to drop into their horizontal positions, when the camera can be extended.

In order to permit of access to the writing slot of an autographic camera without removing the camera from the case, the rear wall of the case shown in Figures 1 and 2 terminates at a level $1^a$ which occurs at a position below and thereby provides in the rear side of the casing an opening which uncovers the writing slot 1^b in the camera, and the flap 1 is adapted to depend below the level 1^a so that when the flap is open the slot 1^b is accessible.

In the modified form of the invention shown in Figures 3 and 4, this top closure portion 1^c may be adapted to be wrapped over from the rear and secured in front by a catch 2^c. This top closure portion has a depending flap 3^c which is adapted to be passed into a loop 4^c to cover an opening occurring in the side of the case, which opening accommodates the film operating device. From this opening a slot passes to the top of the side wall of the case to accommodate the film operating element when the camera is extracted.

In a modified arrangement, the upper rear part of the case, as shown in Figure 4, is formed with a closure member 15 hinged at its lower extremity and adapted to be opened downwardly to thereby permit of access to the writing slot of an autographic camera, without removing the camera from the case. In the back of the casing is an opening 15 which in practice may be closed by any suitable closure.

The case may be provided with the usual strap 17 by which it may be slung from the shoulder, and may be furnished with an inspection aperture 18 coinciding with that in the camera, so that in the process of advancing the film the numbers or indications thereon may be inspected. Advantageously said strap 17 may be secured to the case by being passed through loops 19 on one side and at the bottom of the case, and by means of a buttonhole 20 engaging with a fixed button 21 on the opposite side of the case. By releasing the buttonhole 20 from the button 21 and sliding the case in relation to the strap, the camera can be conveniently held in its slung condition for taking horizontal instead of vertical photographs, the strap then assuming a position in which it is contiguous to the bottom and ends of the case, from which latter it extends upwardly.

What I claim as my invention and desire to secure by Letters Patent is:—

1. A casing for a folding camera open at the front and also open at the upper end and provided at the front with a closure member pivotally supported at the lower end and arranged, when in open position, to permit the falling of the camera front, said casing being also provided with a closure for the open upper end to permit, when open, of the insertion or removal of the camera through said open end.

2. A casing for a folding camera open at the front and also open at the upper end and provided at the front with a closure member pivotally supported at the lower end and arranged, when in open position, to permit the falling of the camera front, said casing being also provided with a closure for the open upper end to permit, when open, of the insertion or removal of the camera through said open end, the said closure being secured at one end to the sides of the casing, on the front of the latter, and serving also as a bar or stop to engage the top of the camera and prevent the camera from falling forwardly.

3. A casing for a folding camera open at the front and also open at the upper end and provided at the front with a closure member pivotally supported at the lower end and arranged, when in open position, to permit the falling of the camera front, said casing being also provided with a closure for the open upper end to permit, when open, of the insertion or removal of the camera through said open end, the said casing having common releasing means for the front closure thereof and the fall front of the camera.

4. A casing for a folding camera open at the front and also open at the upper end and provided at the front with a closure member pivotally supported at the lower end and arranged, when in open position, to permit the falling of the camera front, said casing being also provided with a closure for the open upper end to permit, when open, of the insertion or removal of the camera through said open end, the casing being provided at the rear with an opening to afford access to the writing slot of the camera.

In witness whereof I have hereunto set my hand.

CHARLES HENRY LYDE.